United States Patent [19]

Fischer et al.

[11] Patent Number: 4,886,645
[45] Date of Patent: Dec. 12, 1989

[54] OZONE GENERATOR

[75] Inventors: Melchior Fischer, Lieli; Nazareno Gaiffi, Turgi, both of Switzerland

[73] Assignee: BBC Brown Boveri AG, Baden, Switzerland

[21] Appl. No.: 263,077

[22] Filed: Oct. 27, 1988

[30] Foreign Application Priority Data

Oct. 27, 1987 [CH] Switzerland .................. 4210878

[51] Int. Cl.4 .................. B01J 19/08; B01J 19/12
[52] U.S. Cl. .................. 422/186.18; 422/186.07; 422/186.13; 422/186.19; 422/186.2
[58] Field of Search .............. 422/186.18, 186.19, 422/186.2, 907, 186.07

[56] References Cited

U.S. PATENT DOCUMENTS 2,907,707 10/1959 Wintermute .
3,530,058 9/1970 Blanchard .
3,671,417 6/1972 Louboutin .
4,232,229 11/1980 Tanaka et al. .
4,293,775 10/1981 Feuerstake et al. .
4,461,744 7/1984 Erni et al. .
4,650,648 5/1987 Beer et al. .

FOREIGN PATENT DOCUMENTS 2436914 2/1975 Fed. Rep. of Germany .
2357392 5/1975 Fed. Rep. of Germany .
2811217 9/1979 Fed. Rep. of Germany .
3442121 5/1986 Fed. Rep. of Germany .
2594108 8/1987 France .
648534 3/1985 Switzerland .

OTHER PUBLICATIONS

Patent Abstracts of Japan, vol. 4, No. 16, (C-72)(140), Feb. 7, 1980, JP, 54152690, Jan. 12, 1979, Ozonizer, Osamu Takase.

Primary Examiner—Howard J. Locker
Attorney, Agent, or Firm—Oblon, Spivak, McClelland, Maier & Neustadt

[57] ABSTRACT

In the ozone generator, the inner electrodes which have been continuous until now, are subdivided into individual electrically series-connected segments (7) which are mechanically decoupled from one another. In this manner, ozoniers of almost arbitrary length can be implemented with gap widths of around 0.5 mm.

7 Claims, 2 Drawing Sheets

OZONE GENERATOR

BACKGROUND OF THE INVENTION

1. Field of the Invention

The invention relates to an ozone generator with a tubular outer electrode and a plurality of inner electrodes which exhibit a dielectric layer on their surface facing the outer electrode, means for spacing the inner electrodes from the outer electrode for forming an annular discharge gap and means for electrically connecting all electrodes to an alternating current source.

Ozonizers of this type are known, for example, from Swiss Patent Specification No. 648,534.

2. Discussion of Background

The increasing use of ozone for chemical and physical purposes has led to the ozone tube, which is based on work by Siemens, being decisively improved in technical and economic respects in the recent past. Thus, it is proposed in U.S. Pat. No. 2,811,217, to increase the ozone yield by means of the fact that particular characteristics of the ozonizer (frequency of the feed voltage, dielectric constant of the dielectric material, amplitude of the feed voltage, thickness of the dielectric layer and size of the discharge gap) must comply with particular laws.

For the same purpose, special cooling measures are proposed in other publications for increasing the ozone yield, thus, for example, in addition to the liquid cooling of the outer electrode, the internal cooling of the high voltage electrode with gas or liquid in German Offenlegungsschrift No. 2,357,392, or the intermediate cooling of the ozone-enriched feed gas in the case of cascaded ozonizers in German Offenlegungsschrift No. 2,436,914.

It is generally known that the mean temperature in the discharge gap can be lowered by reducing the discharge gap width in a tubular ozone generator. It can be demonstrated theoretically and experimentally that the mean temperature in the discharge gap is proportional to its gap width.

A low temperature in the discharge gap is desirable since this significantly increases the efficiency of ozone generation.

At present, discharge gap widths of around 1 mm are the state of the art. With a further reduction in gap width, the limits of geometric tolerances of the metal and dielectric tubes used are reached. Particularly in the case of relatively great tube lengths, a further reduction in gap width is limited by the ever present bending of the dielectric and metal tubes.

SUMMARY OF THE INVENTION

Accordingly, one object of this invention is to provide a novel ozone generator which makes it possible to have small gap widths and provides the possibility of having ozone generators of relatively great constructional length.

To achieve this object in an ozone generator of the generic type initially mentioned, it is provided in accordance with the invention that the inner electrodes consist of a plurality of cascaded mechanically decoupled electrode segments which are electrically connected to one another in groups, and each electrode segment is supported spaced independently of the outer tube. In this manner, both simplex and duplex ozonizers of almost any constructional length can be implemented. Bending of the outer tubes has no influence on the gap width tolerance. The insertion of the inner tube is considerably facilitated.

The electrode segments can be glass tubes closed at one end with a metallic lead-through in the bottom for electrically connecting the next element. However, plastic dielectrics are advantageously used as they were described in German Offenlegungsschrift No. 3,442,121 or U.S. Pat. No. 4,650,648. In the case of plastic dielectrics, a metallic lead-through through the bottom can be produced relatively simply.

The use of a segmented dielectric leads to further advantages. The metal tubes may exhibit a bending of up to some mm. The length of the metal tubes is not fixed to approximately 2 m as is currently usual, lengths of up to 6 m are conceivable and required. Long metal tubes bring advantages in cooling them with water: The cooling water can flow along the metal tubes which leads to a required increase in the cooling water flow and thus to a better cooling. As a result, unwanted depositions on the water side of the metal tubes are also reduced.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
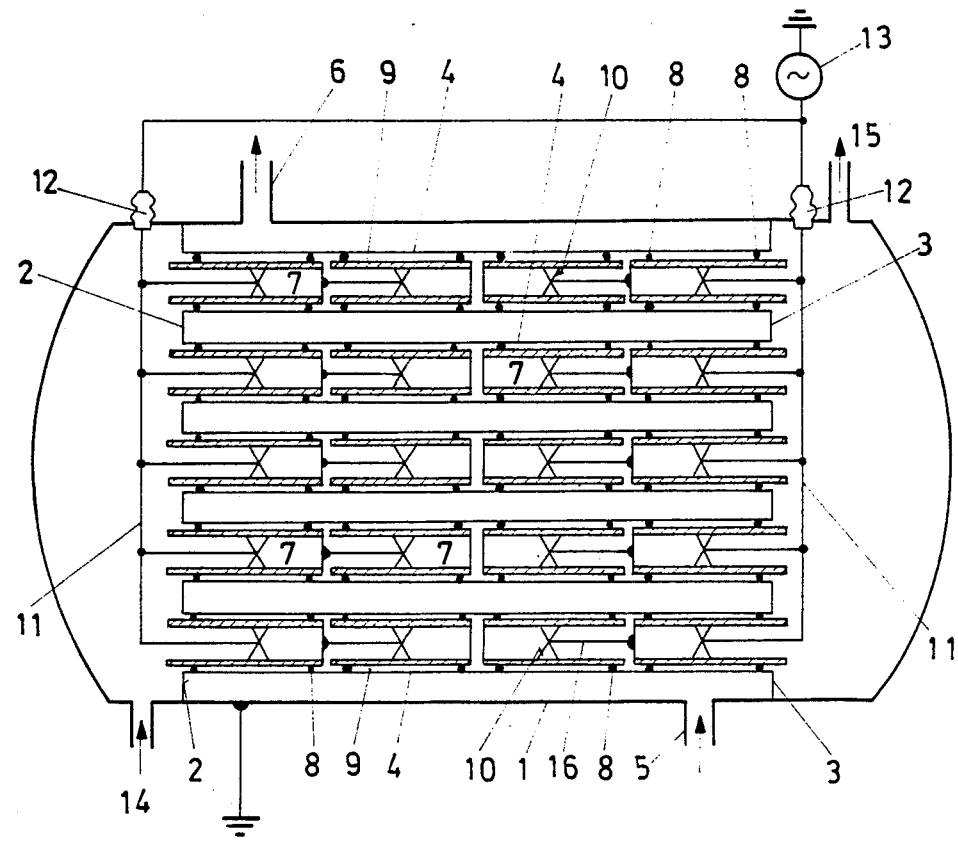
FIG. 1 shows a greatly simplified longitudinal section through an ozonizer tank with a large number of ozone generators.

Referring now to the drawings, wherein like reference numerals designate identical or corresponding parts throughout the several views, FIG. 1 shows in a greatly simplified representation an ozonizer as it is currently constructed for industrial use. A large number of ozone generators are accommodated in a tank 1. The tank 1 exhibits at its end tube-sheet-like partition walls 2,3 into which metal tubes 4 are welded. These metal tubes form the outer electrodes (which are connected to ground potential) of each ozone generator. For reasons of clarity, only five of these tubes 4 are drawn in; in practice, it can be 100 and more tubes. The tubes are sealed with respect to the interior of the tank where they are clamped into the partition walls 2, 3. A coolant, for example water, which is used for external cooling of the metal tubes 4, is conducted into and removed from the interior of the tank via connectors 5, 6 in the tank wall. Segmented inner electrodes 7 which are spaced from the metal tubes 4 by spacers 8 and leave annular discharge gaps 9 free between themselves and the metal tube walls are inserted from both sides into the metal tubes 4.

Contact with the inner electrodes 7 is established via contact elements 10 of brush-like construction. These are each connected at the front ends to one busbar 11, 11'. These busbars 11, 11' are connected via electric lead-throughs 12 to an alternating current source 13 of adjustable frequency and/or amplitude and/or curve shape, the other connection of which is connected to ground potential.

The oxygen-containing feed gas is supplied to ozone generators via a gas inlet connector 14 and leaves the tank again through the gas outlet connector 15.

As can be seen from FIG. 1, two inner electrodes 7 in each case are electrically directly connected to one another in the left and right tank section, respectively. For this purpose, the connection part 16 of the contact elements of the inside inner electrodes leads to the front end of the outside inner electrodes 7.

Figure 2:
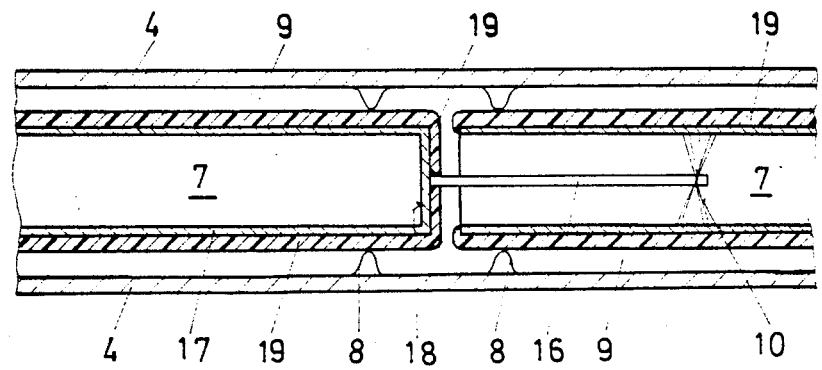
FIG. 2 shows a detail of FIG. 1 with an ozone generator with a ceramic dielectric.
Figure 3:
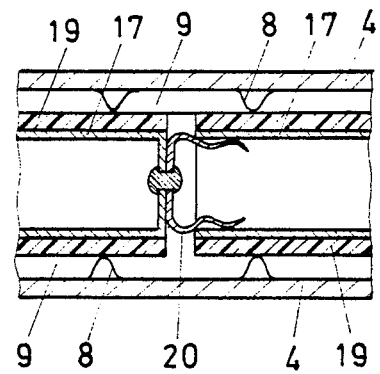
FIG. 3 shows a detail from FIG. 2 with an alternative contact arrangement between adjacent inner electrodes.

FIG. 2 shows the detailed configuration of the inner electrodes 7 and their mutual electric contacts on an enlarged scale. The inner electrode essentially consists of a metal tube 17 which is closed with a cover 18 at its end facing away from the tank front end. This cover 18 can also be constructed of one piece with the metal tube 17. The outer wall of the metal tube 17 plus cover 18 is coated with a typically 2 mm thick dielectric 17 of ceramics. At the open end, the dielectric 19 covers the edge zone of the metal tube in order to prevent unwanted discharges. The coating of the cover 18 fulfils the same function. In this arrangement, this dielectric layer 19 preferably consists of dielectric powders of different grain size and resin bonding. Details on their structure and advantageous characteristics are described in German Offenlegungsschrift No. 3,442,121 or U.S. Pat. No. 4,650,648 to which reference is expressly made here.

On the cover 18 of the outside inner electrode, the connection part 16 of the contact element 10 associated with the inside inner electrode is attached which can be effected by means of soldering, welding, screwing or clamping. Instead of the brush-like contact elements 10 with connection part shown, a contact arrangement 20 can also be used which is directly attached to the cover of the outside inner electrode and is provided with contact fingers of beryllium bronze is similar to brush-type or tulip-type contacts.

It is essential that, on the one hand, the electric connection between the individual inner electrodes 7 is ensured but that, on the other hand, there is a machanical decoupling, that is to say non-rigid connection between adjacent inner electrodes.

If these prerequisites are met, ozone generators of almost any length with low gap values (typically 0.5 mm) and supportable gap value tolerances can be produced.

Figure 4:
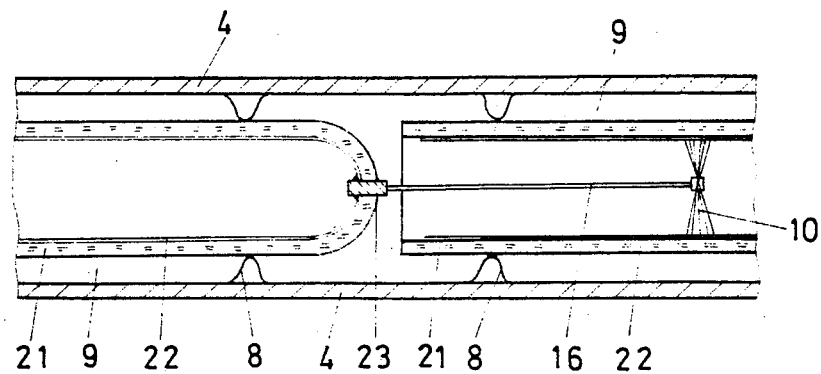
FIG. 4 shows a detail from FIG. 1 with an ozone generator with glass dielectric in the form of glass tubes closed at one end.

The present invention is excellently suitable, in particular, for ozone generators having so-called ceramic dielectrics. As is shown by the embodiments according to FIGS. 4 and 5 however, it is also suitable for ozone generators with a glass dielectric: Ozone generators with ceramic dielectric are now replaced by those with glass dielectric in FIG. 1. According to FIG. 4, these essentially consist of a glass tube 21 which is closed at one end and the entire inner surface of which, apart from an area d at the open end which has a length of a few millimeters, is covered with a metal layer 22 and to this extent, apart from the shortened constructional length, thus correspond to the inner tubes hitherto used. So that an electric connection can then be created between the metal layers 22 of the segments which must be (electrically) connected in series, the outer glass tube 21 exhibits at its closed end a metallic lead-through 23 which is electrically connected to the metallic layer 22. On the outside, the lead-through 23 is connected, for example screwed, to the connection part 16 of the contact element 10 associated with our glass tube.

Figure 5:
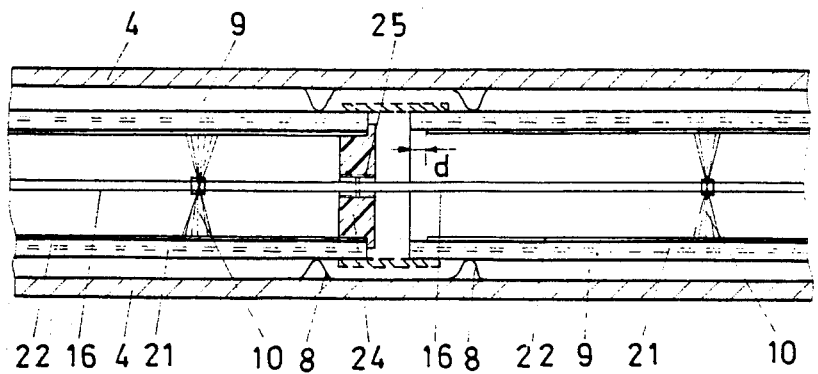
FIG. 5 shows a detail from FIG. 1 with an ozone generator with glass dielectric in the form of open glass tubes.

As is seen in FIG. 5, glass tubes closed at one end can be dispensed with. The glass tubes 21 exhibit a plug 24 at the inner end in each case. The connection part 16 of contact element 10 is extended to the plug 24 and ends in a bush 25 arranged in the plug and is, for example, screwed into the latter. The connection part 16 of adjacent contact element 10 is inserted into this bush from the other side (from outside), for example also screwed to it. Apart from holding the bush, the plug 24 is also used as blocking element which prevents the feed gas from flowing through the interior of the glass tube 21.

Instead of a (sealing) plug 24, thin sleeves of an ozone-resistant plastic, for example teflon, can also be used as is indicated in dashes in FIG. 5. These also ensure that two cascaded tubes are sufficiently mechanically decoupled.

In the case of the ozone generators having a glass dielectric, too, the inner electrodes are mechanically decoupled from one another and electrically connected in series in each tank half, all ozone generators of one tank half being connected to one busbar 11 each. Such an arrangement is frequently called "duplex arrangement".

Naturally, the principle of segmentation on which the invention is based can also be used for so-called simplex ozone generators, that is to say those which are fed from only one tank front end, since the number of segments to be mechanically connected in series basically only depends on the tank length.

The length of a segment is between 10 cm and 50 cm both in the simplex and in the duplex arrangements. Such short segments have negligible bending. Tolerance deviations, either those at the metallic outer tube 4 and/or in the inner tubes 7 or glass tubes 21, or bending of the outer tube 7 virtually average out due to the cascading.

Thus, ozone generators with ceramic dielectric and small widths can be economically produced for the first time.

Obviously, numerous modifications and variations of the present invention are possible in the light of the above teachings. It is therefore to be understood that within the scope of the appended claims, the invention may be practised otherwise than as specifically described herein.

What is claimed as new and desired to be secured by Letters Patent of the United States is:

1. Ozone generator with a tubular outer electrode and a plurality of inner electrodes which exhibit a dielectric layer on their surface facing the outer electrode, with means for spacing the inner electrodes from the outer electrode and forming of an annular discharge gap and means for electrically connecting all electrodes to an alternating current source, wherein the inner electrodes comprise a plurality of cascaded mechanically decoupled electrode segments which are electrically connected to one another in groups, and each segment is supported spaced from the outer electrode independently of the segment immediately adjacent to it.

2. Ozone generator as claimed in claim 1, wherein, in a duplex arrangement, one group is connected to a first busbar and the other group is connected to the other busbar, and that in a simplex arrangement, all segments are connected to a single busbar.

3. Ozone generator as claimed in claims 1 or 2, wherein the inner electrode is a metal tube which is closed at one end and the outer wall of which is coated with a ceramic or plastic/ceramic dielectric.

4. Ozone generator as claimed in claim 3, wherein, for electrically connecting two adjacent metal tubes, one is provided with a contact element which plunges into the interior of the adjacent metal tube.

5. Ozone generator as claimed in claims 1 or 2, wherein the inner electrode is constructed as metallic coating of a glass tube or of a plastic tube.

6. Ozone generator as claimed in claim 5, wherein the tube is closed at one end and is provided at the closed end with a contact element which plunges into the interior of the glass tube adjacent to it.

7. Ozone generator as claimed in claim 5, wherein the tube is open at both ends and is provided at one end with a plug, which plug exhibits means for electrically connecting the contact elements of adjacent glass tubes.

* * * * *